Oct. 27, 1942.   H. BERGMANN   2,300,334
ELECTROMAGNETIC ROTATING FIELD SYSTEM
Filed Aug. 10, 1940

Inventor:
Herbert Bergmann
by
Atty

Patented Oct. 27, 1942

2,300,334

UNITED STATES PATENT OFFICE 2,300,334

ELECTROMAGNETIC ROTATING FIELD SYSTEM

Herbert Bergmann, Berlin, Germany, assignor to C. Lorenz Aktiengesellschaft, Berlin-Tempelhof, Germany, a company Application August 10, 1940, Serial No. 352,155
In Germany September 2, 1939

5 Claims. (Cl. 172—36)

This invention relates to self synchronous motors of the kind used to reproduce angular motion at a distance, and more particularly to the type where a common source of alternating current is used to energize the windings of respective primary members of a transmitter and one or more receivers, the secondary members of which may be rotors or stators, usually of the three phase type having like phase terminals of the transmitter interconnected with those of the receivers. In such systems, if the rotary member of one unit is turned, the other rotary members in circuit will follow in phase, because when one member is displaced angularly in respect to the others, equalizing currents are set up in the respective leads interconnecting the phase windings, of such magnitude and direction that the members are brought into place again.

Motors of the self synchronous type are used for ship's telegraphs, gyro repeaters and the like. Such motors will maintain their phase relationship to within one or two degrees when there is little or no load on the receiver motors. The torque, close to the point of synchronism is very small, perhaps less than an ounce with the receiver shaft displaced two degrees, while a reading taken from the same point with the receiver shaft displaced ten degrees may be in the neighborhood of fifteen ounces.

In order to produce close indications heretofore or where some power had to be produced by the receiver, it was customary to connect transmitter and receiver motors by means of gears to their respective indicating devices, so that the motor made many turns while the indicator advanced a small distance. This arrangement provides accurate angular movement as long as the circuit is not disturbed but should a momentary interruption occur in the circuit, the motors may resume operation in perfect synchronism thereafter, but the respective indicators, owing to the gear work, may continue to operate out of phase with each other.

The present invention has for its object the provision of a motor of the self-synchronous type having a novel rotor arrangement adapted to produce a high torque close to the point where the transmitter and receiver are in phase, thus making closer indications possible where the indicating devices are directly connected to the respective motor shafts.

The invention will now be described with the aid of the accompanying drawing, of which Figure 1 is a vertical section taken through a rotor constructed in accordance with one modification of the present invention.

Figure 1:
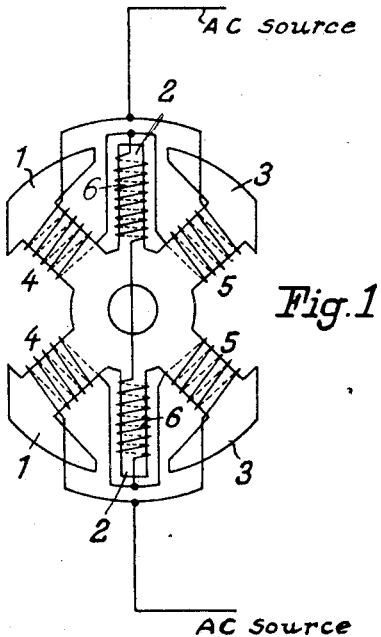

Figure 1 of the drawing shows a composite bipolar, rotor according to the present invention, each composite pole consisting of a closely disposed group of three radially spaced elemental pole members provided with polepieces 1, 2 and 3 energized by windings 4, 6 and 5 respectively, the external leads therefor being connected to a source of alternating current, not shown. The polepieces 1 and 3 are shaped so the ends thereof extend over toward the relatively small central polepieces 2, while a relatively large gap exists between polepieces 3 and also 1 of the opposite poles. Windings 4 and 5 are connected in parallel and in series with winding 6. Since the polepieces of one pole are energized in like manner the arrangement shown produces a magnetic flux highly concentrated in a very small area at the respective polepieces 2, further concentration of the flux being effected by having the central polepiece 2 of much smaller cross section than polepieces 1 and 3. With the construction just described, the receiver motor of a self-synchronous system is much more sensitive to small phase displacements than receivers having the conventional polepiece arrangement where the flux distribution is more uniform over a greater area.

Figure 2:
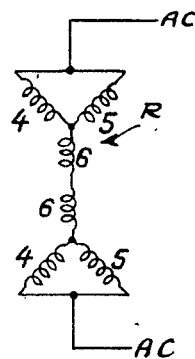
Figures 2, 3 and 4, show different winding arrangements for a rotor of the kind shown in Figure 1.
Figure 3:
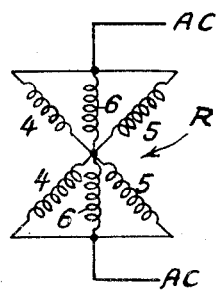
Figure 4:
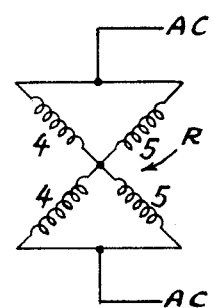

The circuit just described is also shown schematically in Fig. 2. The circuit in Fig. 3 differs from that of Figs. 1 and 2 only in that the windings of each group of elemental coils are connected in parallel. Fig. 4 shows another way of connecting the windings of the respective poles. This arrangement is probably less efficient than the circuits just described. Fig. 4 shows a circuit where the windings of the respective elemental poles of a group are connected in parallel, the winding 6 for the middle pole being omitted.

The invention provides an adequate spread of flux to ensure that the motor will keep in phase, with a limited area thereof of very high density, for extreme accuracy in directly connected indicating devices.

Figure 5:
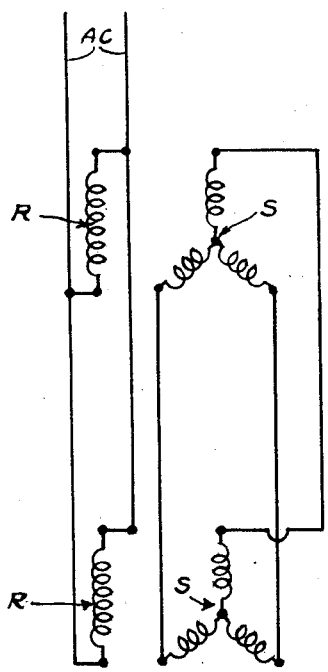
Figure 5 shows a conventional motor circuit.

Figure 5 shows a schematic circuit in which rotor members similar to those just described are indicated as a single coil and the reference character R, while the conventional three phase stator of each motor is indicated by S.

Assume that suitable indicating devices are attached to the shaft of both motors, for example a handle to one motor shaft such as is used on a ship's telegraph, and an indicating pointer to the other, which may cooperate with a stationary dial. Then, if the handle is moved, the pointer will follow accurately. If both shafts are free, i. e., not locked, either instrument may act as a transmitter, because a forced displacement of the phase of one rotor will cause a corresponding movement of the other.

What is claimed is:

1. A rotating field system comprising a source of alternating current, a primary member energized by said source, said primary member comprising a core body and windings thereon, this body having two poles each composed of three elemental poles located beside one another so that each such composite pole comprises two outer elemental poles and a third pole between them, these outer poles having each an enlarged pole piece while the said third pole has none, said enlarged polepieces being tapered toward the third pole, a secondary member, polyphase windings on said secondary member, said primary and secondary members being relatively movable by currents flowing through said polyphase windings.

2. In a system according to claim 1, windings associated with the outer elemental poles and windings associated with the third pole between these, those of the outer poles of each composite pole being connected in parallel with each other and in series with the winding of the third pole.

3. In a system according to claim 1, windings associated with the outer elemental poles and windings associated with the third pole between these, the windings of each composite pole being connected in parallel.

4. In a system according to claim 1, windings associated with the outer elemental poles while the third pole has no winding.

5. A system according to claim 1, wherein the cross-sectional area of the third pole is small compared with that of the outer elemental poles.

HERBERT BERGMANN.